(12) United States Patent
Reuschenbach et al.

(10) Patent No.: US 8,965,661 B2
(45) Date of Patent: Feb. 24, 2015

(54) METHOD AND DEVICE FOR CONTROLLING AN INTERNAL COMBUSTION ENGINE

(75) Inventors: Lutz Reuschenbach, Stuttgart (DE); Oliver Krannich, Tamm (DE); Andreas Lassl, Plochingen (DE)

(73) Assignee: Robert Bosch GmbH, Stuttgart (DE)

( * ) Notice: Subject to any disclaimer, the term of this patent is extended or adjusted under 35 U.S.C. 154(b) by 669 days.

(21) Appl. No.: 13/306,117

(22) Filed: Nov. 29, 2011

(65) Prior Publication Data
US 2012/0143466 A1 Jun. 7, 2012

(30) Foreign Application Priority Data
Dec. 1, 2010 (DE) .......................... 10 2010 062 243

(51) Int. Cl.
| | |
|---|---|
| F02D 13/00 | (2006.01) |
| F02D 41/00 | (2006.01) |
| F01L 1/34 | (2006.01) |
| F02D 41/02 | (2006.01) |
| F02D 41/22 | (2006.01) |
| F02D 41/06 | (2006.01) |
| G01M 15/00 | (2006.01) |

(52) U.S. Cl.
CPC .................. F02D 41/009 (2013.01); F01L 1/34 (2013.01); F02D 41/024 (2013.01); F02D 41/221 (2013.01); F01L 2800/11 (2013.01); F01L 2800/14 (2013.01); F02D 2041/001 (2013.01); Y02T 10/26 (2013.01)
USPC ........................................ 701/102; 123/90.31

(58) Field of Classification Search
USPC .......... 701/102, 114; 123/90.31, 90.34, 90.17
See application file for complete search history.

(56) References Cited

U.S. PATENT DOCUMENTS

| | | | | |
|---|---|---|---|---|
| 7,389,681 B2 * | 6/2008 | Mezger et al. | ............. | 73/112.01 |
| 7,430,998 B2 * | 10/2008 | Stork | .......................... | 123/90.31 |

\* cited by examiner

*Primary Examiner* — Hieu T Vo
(74) *Attorney, Agent, or Firm* — Kenyon & Kenyon LLP

(57) ABSTRACT

A method is described for monitoring a camshaft adjustment of an internal combustion engine in a first operating mode, in which, depending on a time characteristic of an actual value of the angular position of the camshaft adjustment and a time characteristic of a first setpoint value of the angular position of the camshaft adjustment, a decision is made that there are errors in the camshaft adjustment, the decision also depending on a time characteristic of a second setpoint value of the angular position of the camshaft adjustment, the first setpoint value and the second setpoint value each being ascertained at the same operating point of the internal combustion engine, and the first setpoint value for operating the internal combustion engine being ascertained in the first operating mode and the second setpoint value for operating the internal combustion engine being ascertained in a second operating mode.

12 Claims, 2 Drawing Sheets

METHOD AND DEVICE FOR CONTROLLING AN INTERNAL COMBUSTION ENGINE

RELATED APPLICATION INFORMATION

The present application claims priority to and the benefit of German patent application no. 10 2010 062 243.5, which was filed in Germany on Dec. 1, 2010, the disclosure of which is incorporated herein by reference.

FIELD OF THE INVENTION

The present invention is directed to a method for monitoring a camshaft adjustment of an internal combustion engine.

BACKGROUND INFORMATION

Since the rotational speeds of a camshaft and a crankshaft differ by a factor of exactly two, an angular relationship between the camshaft and the crankshaft may be defined with each revolution of the camshaft and with every second revolution of the crankshaft. This may occur, for example, by allocating a reference mark on the crankshaft to a reference flank on the camshaft. This angular relationship is also referred to as the camshaft position or the angular position of the camshaft.

A camshaft adjustment allows a mechanical variation on the valve trigger times at the intake/exhaust channels of a cylinder chamber, i.e., a variation on the angular position of the camshaft. The required adjustment of the camshaft in the direction of early or late is accomplished via a vane adjuster or the like, for example, via oil pressure. The flow of oil to the individual chambers is controlled by solenoid valves, which are addressed via a pulse-width-modulated signal, starting from the control unit. The camshaft must reach a setpoint value with sufficient accuracy within a period of time which is to be maintained. If this is not the case, then it is a misadjustment. Misadjustments during the variable camshaft adjustment have a negative effect on the exhaust gas, among other things, due to suboptimal combustion or even result in engine misfire. In addition, the driver will find fault with a lack of torque or a lack of power and loss in engine smoothness, for example, jerking, which occurs due to faulty camshaft positions and the resulting differences in filling between the banks of cylinders.

Camshaft control may be diagnosed by checking the adjustment angle of the camshaft. For this purpose, the difference between the setpoint value and the actual value is compared with applicable threshold values. If the applicable period of time exceeds or falls below the threshold values, then an error may be set in the camshaft adjustment unit. It is possible for a camshaft adjustment error to be set whenever the actual angle position is outside of an allowed tolerance band after a decay time has elapsed. Using such a camshaft diagnosis, a general adjustment error in the camshaft may be diagnosed.

During a cold start of the internal combustion engine, it is advantageous to adjust the camshaft in such a way that particularly hot exhaust gases result to heat up a catalytic converter in the exhaust gas system as rapidly as possible. Such an operating mode is also referred to as CSERS operating mode ("cold start emission reduction strategy"). The angular position of the camshaft during this CSERS operating mode thus differs from the angular position the camshaft would assume if the CSERS operating mode were not active, i.e., at a warm start of the internal combustion engine.

A draft bill of CARB, a U.S. regulatory authority [California Air Resources Board], requires a differentiation of the diagnostic malfunction of the camshaft adjustment. It is necessary in particular to diagnose whether the angular position of the camshaft during a CSERS operating mode differs from the angular position the camshaft would assume at an operating point which is otherwise the same if the CSERS operating mode were not active if the setpoint value of the angular position in an active CSERS operating mode would be different, i.e., in an inactive CSERS operating mode.

SUMMARY OF THE INVENTION

The method according to the present invention according to the description herein allows such a differentiation of an error in the camshaft adjustment.

According to the exemplary embodiments and/or exemplary methods of the present invention, it is provided that a time characteristic of the actual value of the angular position of the camshaft is compared with the time characteristics of two setpoint values of the angular position. The two setpoint values of the angular position, i.e., a first and a second setpoint value, are calculated here for the same operating point of the internal combustion engine. A first operating mode of the internal combustion engine is used to calculate the first setpoint value, while a second operating mode is used to calculate the second setpoint value. The additional parameters required to ascertain the setpoint value of the angular position, for example, a rotational speed of the internal combustion engine, are assumed to be the same in ascertaining the two setpoint values.

The comparison with these two setpoint values has the advantage that it is then possible to differentiate whether the time characteristic of the actual value of the angular position corresponds rather to the time characteristic of the first setpoint value or of the second setpoint value of the angular position.

The method according to the present invention is characterized in that it is particularly simple.

If the first operating mode is active and the second is inactive, i.e., if the internal combustion engine is operated in the first operating mode, and not operated in the second operating mode when the method according to the present invention is performed, then it is possible to diagnose in particular whether the operation in the first operating mode was proper. In this case, the first setpoint value is the setpoint value actually to be set for the actual value, i.e., the target setpoint value, whereas the second setpoint value is a reference setpoint value.

If the first operating mode is a CSERS operating mode, i.e., an operating mode which occurs during a cold start, and if the second operating mode is not a CSERS operating mode, i.e., an operating mode during a warm start (because the same operating points of the internal combustion engine are assumed in the method according to the present invention except for the operating mode in which the internal combustion engine is operated), then the statutory provisions of CARB, in particular, may be met in a particularly simple manner.

If the diagnosis is restricted to the extent that a decision about whether there is an error in the camshaft adjustment is made only when the first setpoint value and the second setpoint value are at a minimum distance from one another, namely a triggering threshold value, then the robustness of the method according to the present invention is increased because (in agreement with statutory provisions of CARB) a differentiation as to which of the two setpoint values the actual value is more likely to be assigned to is no longer necessary in constellations in which the first setpoint value, the second setpoint value, and the actual value of the angular position are very close to one another.

A particularly simple criterion for an error case, which occurs according to the statutory provisions of CARB, for example, when the characteristic of the actual value corresponds rather to the characteristic of the second setpoint value than to the characteristic of the first setpoint value, occurs when a proximity measure, i.e., a measure of the proximity between the time characteristics of the actual value and each of the two time characteristics of the setpoint values, is calculated. If this proximity measure calculated between the actual value and the second setpoint value is then greater than the proximity measure calculated between the actual value and the first setpoint value, then the error case may be identified in a particularly simple manner when the characteristic of the actual value corresponds rather to the characteristic of the second setpoint value than to the characteristic of the first setpoint value.

A proximity measure between the time characteristic of the actual value and the time characteristic of the first setpoint value, which is particularly simple and robust to ascertain, is given by the fact that a first threshold value is defined, and the proximity measure between the time characteristics of the actual value and the first setpoint value is given by the length of the time during which the actual value is on the side of the first threshold value facing away from the second setpoint value.

This means that two cases are differentiated, depending on whether the first setpoint value is greater or smaller than the second setpoint value. If the first setpoint value is greater than the second setpoint value, then the proximity measure of the time characteristic of the actual value of the angular position from the time characteristic of the first setpoint value is given by the period of time during which the actual value of the angular position is greater than the first threshold value. Conversely, if the first setpoint value is not greater than the second setpoint value, then the proximity measure of the time characteristic of the actual value of the angular position from the time characteristic of the first setpoint value is given by the period of time during which the angular position is smaller than the first threshold value.

This method is particularly robust when the first threshold value is dependent on the first setpoint value at the point in time when the difference between the first setpoint value and the second setpoint value exceeds the triggering threshold value for the first time.

The use of a similar proximity measure between the time characteristics of the actual value of the angular position and of the second setpoint value is particularly advantageous.

Thus, if the first setpoint value is greater than the second setpoint value, then the proximity measure of the time characteristic of the actual value of the angular position from the time characteristic of the second setpoint value is given by the period of time during which the actual value of the angular position is smaller than a second threshold value. However, if the first setpoint value is not greater than the second setpoint value, then the proximity measure of the time characteristic of the actual value of the angular position from the time characteristic of the second setpoint value is given by the period of time during which the angular position is greater than a second threshold value.

It is particularly advantageous if the second threshold value is dependent on the second setpoint value at the point in time when the difference between the first setpoint value and the second setpoint value exceeds the triggering threshold for the first time.

The figures show a particularly advantageous specific embodiment of the method according to the present invention.

DETAILED DESCRIPTION

Figure 1:
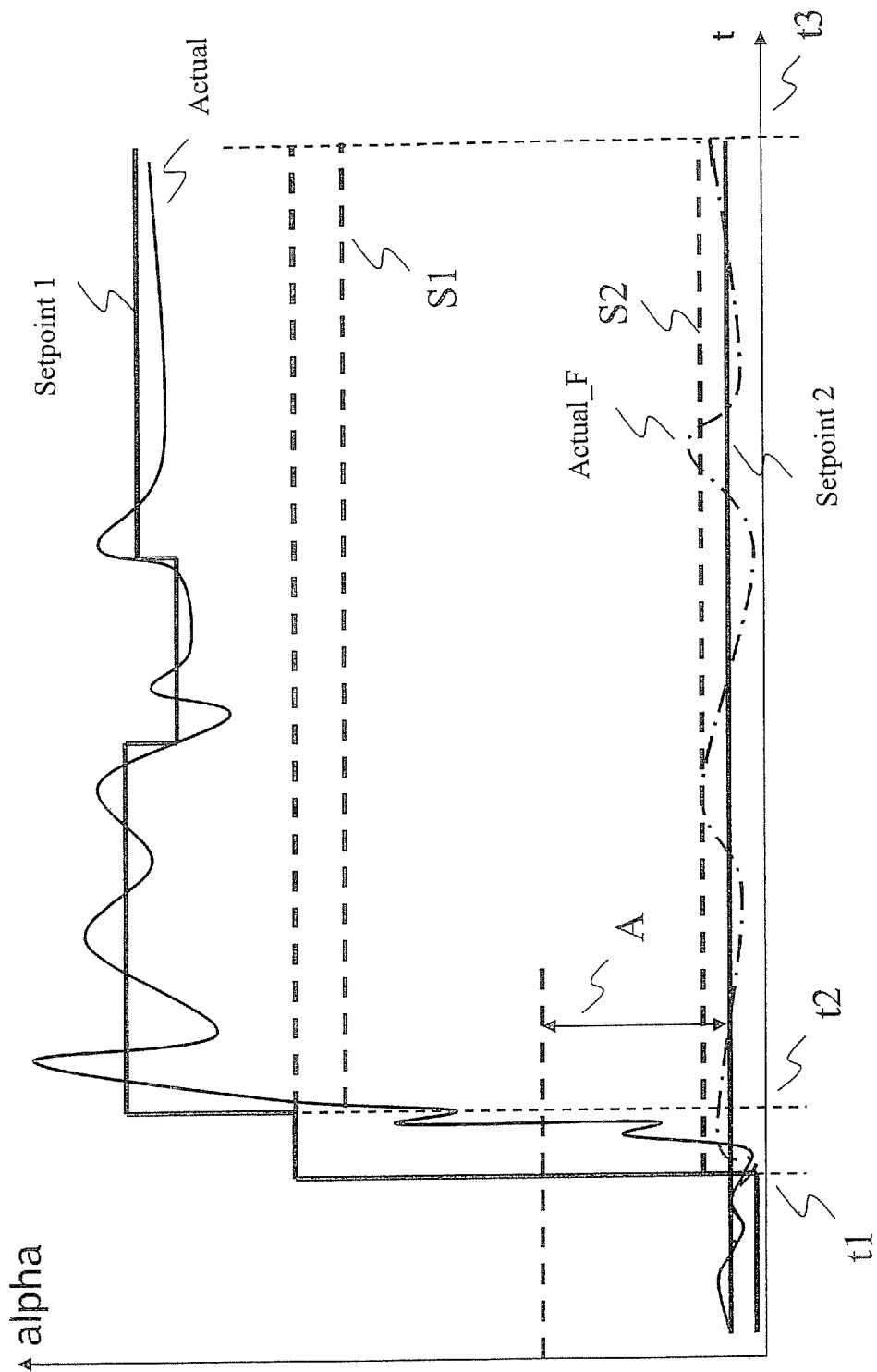
FIG. 1 shows time characteristics of actual values and setpoint values of the angular position of the camshaft.

FIG. 1 shows characteristics of the angular position (alpha) of the camshaft, plotted as a function of time (t). This shows the first setpoint value (setpoint1) of the angular position and the second setpoint value (setpoint2) of the angular position. The first setpoint value (setpoint1) here corresponds to a CSERS operating mode, while the second setpoint value (setpoint2) corresponds to a second operating mode, which is not a CSERS operating mode (i.e., a warm start). Shown here is the behavior during a cold start, i.e., the actual setpoint value, which is predefined for the camshaft adjustment, is the first setpoint value (setpoint1).

Up to a first point in time t1, first setpoint value (setpoint1) and second setpoint value (setpoint2) are close together. At first point in time t1, the first setpoint value (setpoint1) jumps to a larger angular position (alpha), while the second setpoint value (setpoint2) remains constant also in the remaining time characteristic in the example shown here. The difference between the first setpoint value (setpoint1) and the second setpoint value (setpoint2) exceeds a triggering threshold value (A) at the first point in time (t1). However, it is also possible for the first setpoint value (setpoint1) to remain constant, for example, and for the second setpoint value (setpoint2) to jump to a larger angular position (alpha). It is likewise possible for the first setpoint value (setpoint1) or the second setpoint value (setpoint2) to jump to a smaller angular position.

The setpoint values are ascertained in a discrete time frame. A first threshold value (S1) and a second threshold value (S2) are ascertained at the next discrete point in time (t2) following the first point in time (t1). The first threshold value (S1) is smaller by a predefinable first difference than the value assumed by the first setpoint value (setpoint1) at the second point in time (t2). The second threshold value (S2) is greater by a predefinable second difference than the value assumed by the second setpoint value (setpoint2) at the second point in time (t2). The predefinable first difference and/or the predefinable second difference may be selected to be small here, for example, as small as typical fluctuations in the actual position (actual) of the camshaft and/or system inaccuracies during operation of the internal combustion engine, for example 2°. It is also possible in particular to select the predefinable first difference and/or the predefinable second difference to be zero.

In the case shown in FIG. 1, the first setpoint value (setpoint1) is larger than the second setpoint value (setpoint2) at the second point in time (t2). However, if the first setpoint value (setpoint1) is smaller than the second setpoint value (setpoint2) by at least the triggering threshold value (A), then the first threshold value (S1) is selected to be larger by the predefinable first difference than the value assumed by the first setpoint value (setpoint1) at the second point in time (t2), and the second threshold value (S2) is selected to be smaller by the predefinable second difference than the value assumed by the second setpoint value (setpoint2) at the second point in time (t2).

First setpoint value (setpoint1), first threshold value (S1), second threshold value (S2), and second setpoint value (setpoint2) thus always form an ascending or descending ranking at the second point in time (t2).

FIG. 1 also shows the time characteristic of the actual value (actual) of the angular position of the camshaft. In the example shown here, the actual value (actual) corresponds to a nonfaulty camshaft adjustment, i.e., the actual value (actual) follows the first setpoint value (setpoint1) with a slight time delay and oscillations. At the second point in time (t2), the actual value (actual) is below the first threshold value (S1) but above the second threshold value (S2).

FIG. 1 also shows with a dash-dot line, a faulty actual characteristic (actual_F) of the angular position. This faulty actual characteristic (actual_F) follows with oscillations the characteristic of the second setpoint value (setpoint2). The faulty actual characteristic (actual_F) here always assumes smaller values than the first threshold value (S1) and, with the exception of a few points in time, also assumes values smaller than the second threshold value (S2).

The method according to the present invention begins at the second point in time (t2) and ends at a third point in time (t3), which comes after the second point in time (t2) by a predefinable time interval, for example, one second. During the time interval [t2; t3], an analysis is made of whether the actual value (actual) of the angular position is closer to the first setpoint value (setpoint1) or closer to the second setpoint value (setpoint2). As described below, a check is made here in particular of whether the actual value (actual) of the angular position exceeds the first threshold value (S1). Since the predefinable first difference is selected to be small, within the scope of the accuracy defined by the predefinable first difference, a check is made of whether the actual value (actual) reaches the first setpoint value (setpoint1) in particular.

It is thus found to be an additional advantage of the present invention that the diagnostic method according to the present invention is accurate as to the target value, i.e., a check is made of whether the actual target value (i.e., the first setpoint value (setpoint1)), which the actual value (actual) should follow, has in fact been reached.

Figure 2:
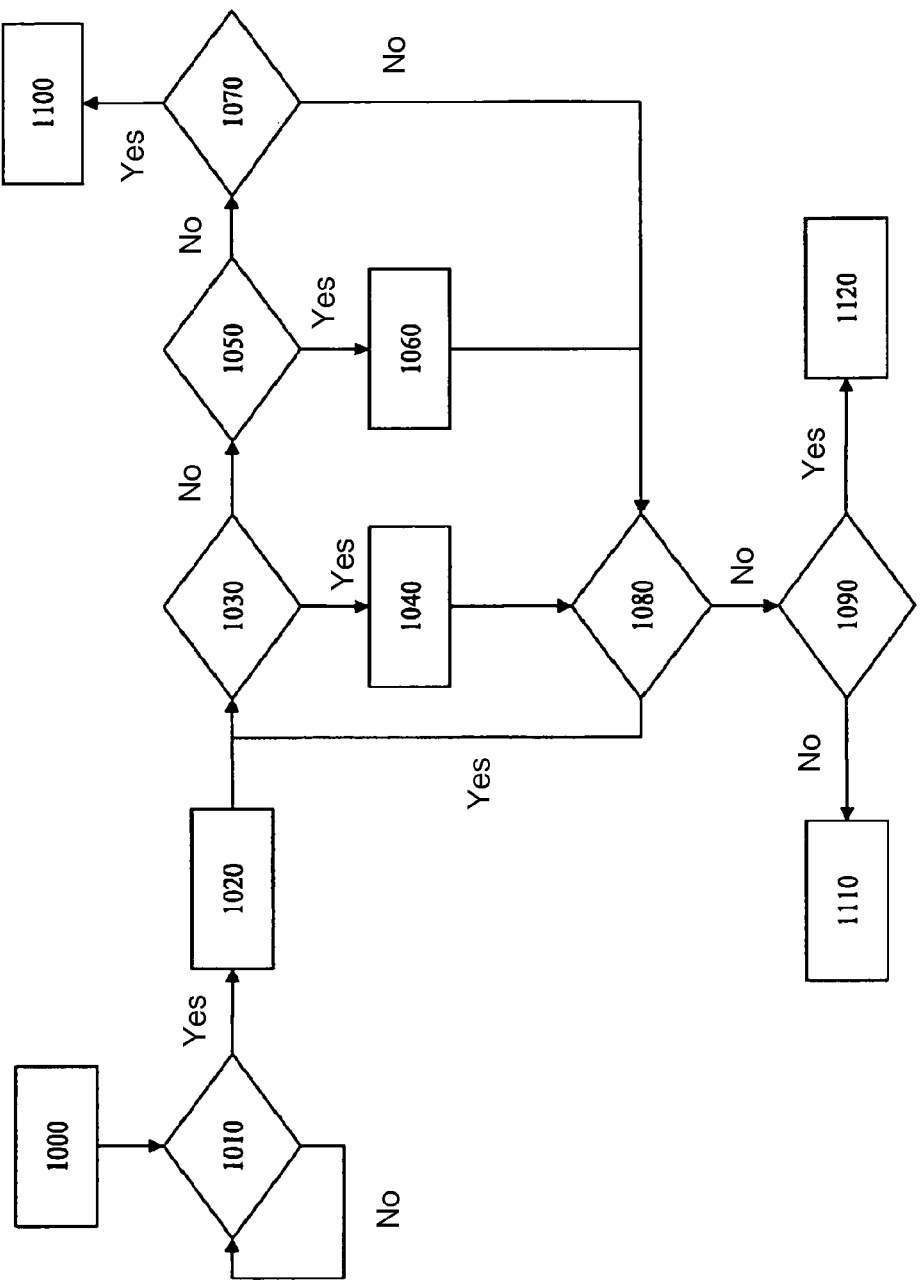
FIG. 2 shows the sequence of the method according to the present invention.

A method for performing the diagnostic method is shown in FIG. 2. This method may be performed on a control unit clocked at discrete points in time, for example, an engine control unit.

The method illustrated in FIG. 2 is described below for the case when the second setpoint value (setpoint2) is greater than the first setpoint value (setpoint1). However, if the first setpoint value (setpoint1) is smaller than the second setpoint value (setpoint2), then the values of the first setpoint value (setpoint1), the second setpoint value (setpoint2), and the crankshaft angle (actual) multiplied by a factor of "−1" are used instead of the first setpoint value (setpoint1), the second setpoint value (setpoint2), and the crankshaft angle (actual).

The method begins in step 1000. In step 1010, a check is made of whether the first setpoint value (setpoint1) is greater than the second setpoint value (setpoint2) by at least the triggering threshold value. If this is the case, step 1020 then follows; otherwise step 1010 is repeated. In the exemplary embodiment, the method branches off to step 1020 for the first time at the second point in time (t2).

In step 1020 a first counter N1 and a second counter N2 are set at the value 0. An ending time is set at the sum of the instantaneous point in time and the predefinable time interval, i.e., in the present example "t2+1s." The first threshold value (S1) is set at the value of the first setpoint value (setpoint1) minus the first predefinable difference; the second threshold value (S2) is set at the value of the second setpoint value (setpoint2) plus the value of the second predefinable difference. Step 1030 then follows.

In step 1030, a check is made of whether the actual value (actual) of the angular position is greater than the first threshold value (S1). If this is the case, step 1040 follows, in which the first counter (N1) is incremented by one and then the method continues with step 1080. Otherwise step 1050 follows, in which a check is made of whether the actual value (actual) of the angular position is smaller than the second threshold value (S2). If this is the case, step 1060 follows, in which the second counter is incremented by one and then the method continues with step 1080. If this is not the case, step 1070 follows.

In step 1070, a check is made of whether the termination criteria for terminating the diagnostic method have been met. Such a termination criterion may be given, for example, by the fact that the first setpoint value (setpoint1) falls below the first threshold value (S1) or the second setpoint value (setpoint2) rises above the second threshold value (S2). If at least one of the termination criteria is met, step 1120 follows, in which the diagnostic method is terminated without a result. If no termination criterion is met, step 1080 follows.

In step 1080, there is a wait for the next discrete point in time and then a check is made of whether the instantaneous point in time is less than the ending time. If this is the case, step 1030 is performed again. If this is not the case, step 1090 follows.

Thus in steps 1030, 1040, 1050, 1060, 1070 and 1080, iterative calculations are performed during two proximity measures: one for the proximity of the time characteristics between the actual value (actual) and the first setpoint value (setpoint1) and one for the proximity of the time characteristics between the actual value (actual) and the second setpoint value (setpoint2).

In step 1090, an analysis is made of whether the first counter (N1) is greater than the second counter (N2). If this is not the case, as in the case of the faulty actual characteristic (actual_F) illustrated in FIG. 1, for example, then step 1110 follows, in which an error in the camshaft adjustment is detected. However, if this is the case, then step 1120 follows, in which it is recognized that the camshaft adjustment is functioning properly with respect to the errors checked.

As already explained, the method is described for the case here in which the first threshold value (S1) assumes larger values than the second threshold value (S2) from the first point in time (t1) and in particular from the second point in time (t2). However, if the first threshold value (S1) assumes smaller values than the second threshold value (S2), then either the first threshold value (S1), the second threshold value (S2), or the actual value (actual) of the angular position may be multiplied by a factor "−1" as described above.

Alternatively, steps 1010, 1020, 1030, 1050 and 1070 may be modified as follows to handle this case: in step 1010, a check is made of whether the first setpoint value (setpoint1) is smaller than the second setpoint value (setpoint2) minus the triggering threshold value (A).

In step 1020, the definition of the first threshold value (S1) and the second threshold value (S2) must be modified as follows: The first threshold value (S1) is set as the value of the first setpoint value (setpoint1) plus the first predefinable threshold value, the second threshold value (S2) is set at the value of the second setpoint value (setpoint2) minus the first predefinable threshold value.

In step 1030, a check is made of whether the actual value (actual) is smaller than the first threshold value (S1), and in step 1050, a check is made of whether the actual value (actual) is greater than the second threshold value (S2).

The termination criteria in step 1070 must also be adapted. Valid termination criteria include, for example, the fact that the first setpoint value (setpoint1) rises above the first threshold value (S1) or that the second setpoint value (setpoint2) drops below the second threshold value (S2).

What is claimed is:

1. A method for monitoring a camshaft adjustment of an internal combustion engine in a first operating mode, the method comprising:
    making a decision, depending on a time characteristic of an actual value of the angular position of the camshaft adjustment and a time characteristic of a first setpoint value of the angular position of the camshaft adjustment, that there are errors in the camshaft adjustment, wherein the decision as to whether there is an error in the camshaft adjustment also depends on a time characteristic of a second setpoint value of the angular position of the camshaft adjustment; and
    ascertaining the first setpoint value and the second setpoint value at the same operating point of the internal combustion engine, wherein the first setpoint value is ascertained for operating the internal combustion engine in the first operating mode, and wherein the second setpoint value is ascertained for operating the internal combustion engine in a second operating mode.

2. The method of claim 1, wherein the internal combustion engine is operated in the first operating mode and is not operated in the second operating mode.

3. The method of claim 1, wherein the first operating mode is a CSERS operating mode and the second operating mode is not a CSERS operating mode.

4. The method of claim 1, wherein a decision made as to whether there is an error in the camshaft adjustment is made only when a difference between the first setpoint value and the second setpoint value is greater than a triggering threshold value.

5. The method of claim 1, wherein a decision is made that there are errors when a proximity measure of the time characteristic of the actual value of the angular position from the time characteristic of the second setpoint value is greater than a proximity measure of the time characteristic of the actual value of the angular position from the time characteristic of the first setpoint value.

6. The method of claim 5, wherein when the first setpoint value is greater than the second setpoint value, the proximity measure of the time characteristic of the actual value of the angular position from the time characteristic of the first setpoint value is given by a time interval during which the actual value of the angular position is greater than a first threshold value, and when the first setpoint value is not greater than the second setpoint value, the proximity measure of the time characteristic of the actual value of the angular position from the time characteristic of the second setpoint value is given by a time interval during which the actual value of the angular position is smaller than a first threshold value.

7. The method of claim 6, wherein the first threshold value depends on the first setpoint value at the point in time at which the difference between the first setpoint value and the second setpoint value exceeds the triggering threshold value for the first time.

8. The method of claim 5, wherein when the first setpoint value is greater than the second setpoint value, the proximity measure of the time characteristic of the actual value of the angular position from the time characteristic of the second setpoint value is given by a time interval during which the actual value of the angular position is smaller than a second threshold value, and when the first setpoint value is not greater than the second setpoint value, the proximity measure of the time characteristic of the actual value of the angular position from the time characteristic of the second setpoint value is given by a time interval during which the actual value of the angular position is greater than a second threshold value.

9. The method of claim 8, wherein the second threshold value depends on the second setpoint value at the point in time when the difference between the first setpoint value and the second setpoint value exceeds the triggering threshold value for the first time.

10. A computer readable medium having a computer program, which is executable by a processor, comprising:
    a program code arrangement having program code for monitoring a camshaft adjustment of an internal combustion engine in a first operating mode, by performing the following:
        making a decision, depending on a time characteristic of an actual value of the angular position of the camshaft adjustment and a time characteristic of a first setpoint value of the angular position of the camshaft adjustment, that there are errors in the camshaft adjustment, wherein the decision as to whether there is an error in the camshaft adjustment also depends on a time characteristic of a second setpoint value of the angular position of the camshaft adjustment; and
        ascertaining the first setpoint value and the second setpoint value at the same operating point of the internal combustion engine, wherein the first setpoint value is ascertained for operating the internal combustion engine in the first operating mode, and wherein the second setpoint value is ascertained for operating the internal combustion engine in a second operating mode.

11. An electrical storage medium for a control device of an internal combustion engine, comprising:
    a computer program, which is executable by a processor, including a program code arrangement having program code for monitoring a camshaft adjustment of an internal combustion engine in a first operating mode, by performing the following:
        making a decision, depending on a time characteristic of an actual value of the angular position of the camshaft adjustment and a time characteristic of a first setpoint value of the angular position of the camshaft adjustment, that there are errors in the camshaft adjustment, wherein the decision as to whether there is an error in the camshaft adjustment also depends on a time characteristic of a second setpoint value of the angular position of the camshaft adjustment; and
        ascertaining the first setpoint value and the second setpoint value at the same operating point of the internal combustion engine, wherein the first setpoint value is ascertained for operating the internal combustion engine in the first operating mode, and wherein the second setpoint value is ascertained for operating the internal combustion engine in a second operating mode.

12. A control and/or regulating device of an internal combustion engine, comprising:
    an electrical storage medium for a control device of an internal combustion engine, including a computer program, which is executable by a processor, having a program code arrangement having program code for monitoring a camshaft adjustment of an internal combustion engine in a first operating mode, by performing the following:

making a decision, depending on a time characteristic of an actual value of the angular position of the camshaft adjustment and a time characteristic of a first setpoint value of the angular position of the camshaft adjustment, that there are errors in the camshaft adjustment, wherein the decision as to whether there is an error in the camshaft adjustment also depends on a time characteristic of a second setpoint value of the angular position of the camshaft adjustment; and ascertaining the first setpoint value and the second setpoint value at the same operating point of the internal combustion engine, wherein the first setpoint value is ascertained for operating the internal combustion engine in the first operating mode, and wherein the second setpoint value is ascertained for operating the internal combustion engine in a second operating mode.

* * * * *